(12) United States Patent
Busch-Sorensen et al.

(10) Patent No.: US 10,019,852 B2
(45) Date of Patent: Jul. 10, 2018

(54) INTEGRATION OF POSITION SENSOR WITH RF READER

(71) Applicant: Cubic Corporation, San Diego, CA (US)

(72) Inventors: Thomas Busch-Sorensen, San Diego, CA (US); Rasheed Behrooznia, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/666,069

(22) Filed: Aug. 1, 2017

(65) Prior Publication Data
US 2018/0075667 A1 Mar. 15, 2018

Related U.S. Application Data

(63) Continuation of application No. 15/340,693, filed on Nov. 1, 2016.
(Continued)

(51) Int. Cl.
*G06K 5/00* (2006.01)
*G07B 15/00* (2011.01)
(Continued)

(52) U.S. Cl.
CPC ......... *G07B 15/00* (2013.01); *G06K 7/10009* (2013.01); *G06K 7/10128* (2013.01);
(Continued)

(58) Field of Classification Search
CPC ............... G07B 15/00; G06K 7/10297; G06K 19/07749; H04W 4/008; G07F 7/1008; G06Q 20/341
(Continued)

(56) References Cited

U.S. PATENT DOCUMENTS 9,786,100 B2   10/2017   Busch-sorensen et al.
2004/0118930 A1*  6/2004  Berardi ............... G06K 7/0008
                                                      235/492
(Continued)

FOREIGN PATENT DOCUMENTS

FR       2770315 A1     4/1999
WO    2017/079192 A1    5/2017

OTHER PUBLICATIONS

PCT/US2016/059981, "International Search Report and Written Opinion", dated Feb. 9, 2017, 11 pages.

*Primary Examiner* — Karl D Frech
(74) *Attorney, Agent, or Firm* — Kilpatrick Townsend & Stockton

(57) ABSTRACT

Embodiments of the invention integrate a contactless media reader with sensors to detect that an object is within the contactless media reader operating field and optionally detect the position, orientation and speed of the object as it approaches the contactless media reader. The object can be, for example, a contactless fare media such as a contactless smartcard, a personal processing device such as a smart phone, personal computer, tablet computer or the like, or the user's hand, one or more fingers, or both. Embodiments may use one or more distance/position sensors to determine the position of the contactless fare media relative to the contactless media reader. Accordingly, embodiments of the present invention enhance contactless media reader performance by adding user interaction capabilities and providing feedback to the contactless fare media user.

20 Claims, 12 Drawing Sheets

Related U.S. Application Data

(60) Provisional application No. 62/249,742, filed on Nov. 2, 2015.

(51) Int. Cl.
  *G06K 7/10* (2006.01)
  *H04W 4/00* (2018.01)
  *H04W 4/80* (2018.01)

(52) U.S. Cl.
  CPC ..... *G06K 7/10297* (2013.01); *G06K 7/10425* (2013.01); *H04W 4/008* (2013.01); *H04W 4/80* (2018.02)

(58) Field of Classification Search
  USPC .............................. 235/380, 382, 382.5, 492
  See application file for complete search history.

(56) References Cited

U.S. PATENT DOCUMENTS

| | | |
|---|---|---|
| 2006/0197652 A1 | 9/2006 | Hild et al. |
| 2008/0265023 A1* | 10/2008 | Nassimi ............... G06K 7/0008 235/382 |
| 2009/0308937 A1* | 12/2009 | Yagi ................... G06K 19/0707 235/492 |
| 2010/0312617 A1 | 12/2010 | Cowen et al. |
| 2017/0124773 A1 | 5/2017 | Busch-Sorensen et al. |

\* cited by examiner

INTEGRATION OF POSITION SENSOR WITH RF READER

CROSS-REFERENCES TO RELATED APPLICATIONS

This application is a continuation of U.S. patent application Ser. No. 15/340,693, filed Nov. 1, 2016, entitled "INTEGRATION OF POSITION SENSOR WITH RF READER," which is a nonprovisional of and claims the benefit of priority to U.S. Provisional Patent Application No. 62/249,742, filed Nov. 2, 2015, entitled "INTEGRATION OF POSITION SENSOR WITH RF READER," the entire content of which is herein incorporated by reference in its entirety.

FIELD OF THE INVENTION

The current field relates generally to contactless fare readers and/or integrating position sensors with contactless media readers in gate entry applications, although embodiments and applications are not so limited.

BACKGROUND OF THE INVENTION

Several types of contactless data interfaces only operate reliably within a limited field around a contactless media reader. Contactless media readers may either have no information about the distance to the contactless fare media or may rely on the received signal strength to estimate the distance. However, the received signal strength is a poor indicator of distance as it can vary many decibels, depending on contactless fare media orientation and obstacles between the contactless fare media and the contactless media reader. With traditional methods, the only way to detect that a contactless fare media holder has presented a contactless fare media to a contactless media reader is when the contactless fare media responds to a "wakeup" call. This means that a contactless media reader has to poll continuously in order to detect a contactless fare media in real time. Such functionality consumes a lot of power and there is no indication of how close the contactless fare media is to the contactless media reader.

BRIEF SUMMARY OF THE INVENTION

In one embodiment of the invention is a method of integrating contactless media readers with sensors for completing data transactions with contactless media. The method comprises detecting a contactless media by emitting a first pulse, by a first sensor, at a first emit time, wherein the first sensor is at a first location in the central region of the contactless media reader and detecting, by the first sensor, a first returned pulse at a first detect time. The method further comprises, in response to the detecting the contactless media: receiving a first distance from the first sensor, wherein the first distance is generated from the first emit time and the first detect time, and wherein the first distance corresponds to the distance from the contactless media to the first sensor; determining the first distance is less than or equal to a first threshold; and signaling the contactless media reader to communicate with the contactless media to begin a data transaction. In yet another embodiment is a method of integrating contactless media readers with sensors for data transactions with contactless media, wherein the contactless media reader is an radio frequency reader or a Bluetooth® Low Energy reader And another embodiment is a method of integrating contactless media readers with sensors for data transactions with contactless media, wherein the sensor is an InfraRed reflection or transmission sensor, charge coupled device camera, time-of-flight sensor, ultrasonic sensor, or capacitive sensor. In a further embodiment is a method of integrating contactless media readers with sensors for data transactions with contactless media, wherein the contactless media is a contactless smart card or a user device. In another embodiment is the method of integrating contactless media readers with sensors for data transactions with contactless media, the method further comprising detecting an object by: emitting a second pulse, by the first sensor, at a second emit time; and detecting, by the first sensor, a first returned pulse at a first detect time. The method further comprises, in response to the detecting the object: receiving a second distance from the first sensor, wherein the second distance is generated from the second emit time and the second detect time, and wherein the second distance corresponds to the distance from the object to the first sensor; determining the second distance is less than or equal to a second threshold; and sending a message to the contactless media reader indicating a user selection, wherein the user selection is based on the detection of the object at the second distance. And a further embodiment is the method of integrating contactless media readers with sensors for data transactions with contactless media, wherein detecting a movement and wherein the movement is made by the contactless media, comprises: emitting one or more additional pulses, by one or more additional sensors, at one or more additional emit times, wherein the one or more sensors are not located in the central region of the contactless media reader; and detecting, by the one or more additional sensors, one or more additional return pulses at one or more additional detect times. The method further includes, in response to the detecting the moving object: receiving one or more additional distances from the one or more additional sensors, wherein the one or more additional distances are generated from the one or more additional emit times and the one or more additional detect times, and wherein the one or more additional distances correspond to the one or more additional distances from the moving object to the one or more additional sensors; detecting a pattern from the movement across the one or more additional sensors; and sending a message to the contactless media reader indicating a user selection, wherein the user selection e is based on the pattern. A variation of this embodiment is that the object is the contactless media. A further embodiment is a method of integrating contactless media readers with sensors for data transactions with contactless media, wherein detecting a movement and wherein the movement is made by the contactless media, comprises: emitting one or more additional pulses, by one or more additional sensors, at one or more additional emit times, wherein the one or more sensors are not located in the central region of the contactless media reader; and detecting, by the one or more additional sensors, one or more additional return pulses at one or more additional detect times. The method includes, in response to the detecting the moving object: receiving one or more additional distances from the one or more additional sensors, wherein the one or more additional distances are generated from the one or more additional emit times and the one or more additional detect times, and wherein the one or more additional distances correspond to the one or more additional distances from the moving object to the one or more additional sensors; detecting a pattern from the movement across the one or more additional sensors; and sending a message to the contactless media reader indicating a user selection, wherein the user selection is based on the pattern. the object is the contactless media.

In another embodiment is a system for integrating contactless media readers with sensors for completing data transactions with contactless media. The system comprises: a first sensor, to detect a contactless media configured to: emit a first pulse, at a first emit time, wherein the first sensor is at a first location in the central region of the contactless media reader; and detect a first returned pulse at a first detect time. The system further comprises a contactless media reader configured to: receive a first distance from the first sensor, wherein the first distance is generated from the first emit time and the first detect time, and wherein the first distance corresponds to the distance from the contactless media to the first sensor; determine the first distance is less than or equal to a first threshold; and begin a data transaction with the contactless media. In another embodiment is the system for integrating contactless media readers with sensors for completing data transactions with contactless media, wherein the contactless media reader is an radio frequency reader or a Bluetooth® Low Energy reader. Yet a further embodiment is a system for integrating contactless media readers with sensors for completing data transactions with contactless media, wherein the contactless media reader is an radio frequency reader or a Bluetooth® Low Energy reader. Another embodiment is the system for integrating contactless media readers with sensors for completing data transactions with contactless media, wherein the contactless media reader is an radio frequency reader or a Bluetooth® Low Energy reader. And another embodiment is the system for integrating contactless media readers with sensors for completing data transactions with contactless media, wherein the sensor is a reflection or transmission sensor, charge coupled device camera, time-of-flight sensor, ultrasonic sensor, or capacitive sensor. A further embodiment is the system for integrating contactless media readers with sensors for completing data transactions with contactless media, wherein the contactless media is a contactless smart card or a user device. In still another embodiment of the system for integrating contactless media readers with sensors for completing data transactions with contactless media, the system further comprising: the first sensor, to detect an object, further configured to: emit a second pulse at a second emit time; and detect a first returned pulse at a first detect time. The contactless media reader is further configured to: receive a second distance from the first sensor, wherein the second distance is generated from the second emit time and the second detect time, and wherein the second distance corresponds to the distance from the object to the first sensor; determine the second distance is less than or equal to a second threshold; and send a message to the contactless media reader indicating a user selection, wherein the user selection is based on the detection of the object at the second distance. And a variation of this embodiment is that the object is the contactless media. In yet another embodiment the system for integrating contactless media readers with sensors for completing data transactions with contactless media, wherein: one or more additional sensors, to detect a movement, and wherein the movement is made by the contactless media, configured to: emit one or more additional pulses at one or more additional emit times, wherein the one or more sensors are not located in the central region of the contactless media reader; and detect one or more additional return pulses at one or more additional detect times. The contactless media reader is further configured to: receive one or more additional distances from the one or more additional sensors, wherein the one or more additional distances are generated from the one or more additional emit times and the one or more additional detect times, and wherein the one or more additional distances correspond to the one or more additional distances from the moving object to the one or more additional sensors; detect a pattern from the movement across the one or more additional sensors; and determine a user selection, wherein the user selection is based on the pattern.

Another embodiment is a fare gate with a contactless media reader, integrated with sensors, for completing data transactions with contactless media. The fare gate comprising a first sensor, to detect a contactless media, configured to: emit a first pulse, at a first emit time, wherein the first sensor is at a first location in the central region of the contactless media reader; and detect a first returned pulse at a first detect time. The contactless media reader is configured to: receive a first distance from the first sensor, wherein the first distance is generated from the first emit time and the first detect time, and wherein the first distance corresponds to the distance from the contactless media to the first sensor; determine the first distance is less than or equal to a first threshold; and begin a data transaction with the contactless media. Yet another embodiment is the fare gate with a contactless media reader, integrated with sensors, for completing data transactions with contactless media, wherein the contactless media reader is an radio frequency reader or a Bluetooth® Low Energy reader. And another embodiment is the fare gate with a contactless media reader, integrated with sensors, for completing data transactions with contactless media, wherein the sensor is an InfraRed reflection or transmission sensor, charge coupled device camera, time-of-flight sensor, ultrasonic sensor, or capacitive sensor. A further embodiment is the fare gate with a contactless media reader, integrated with sensors, for completing data transactions with contactless media, wherein the contactless media is a contactless smart card or a user device. Another embodiment is the fare gate with a contactless media reader, integrated with sensors, for completing data transactions with contactless media, wherein the contactless media is a contactless smart card or a user device. A further embodiment is the fare gate with a contactless media reader, integrated with sensors, for completing data transactions with contactless media, the system further comprising the first sensor, to detect an object, further configured to: emit a second pulse at a second emit time; and detect a first returned pulse at a first detect time. The contactless media reader is further configured to: receive a second distance from the first sensor, wherein the second distance is generated from the second emit time and the second detect time, and wherein the second distance corresponds to the distance from the object to the first sensor; determine the second distance is less than or equal to a second threshold; and send a message to the fare gate indicating a user selection, wherein the user selection is based on the detection of the object at the second distance. And yet another embodiment is the fare gate with a contactless media reader, integrated with sensors, for completing data transactions with contactless media, wherein one or more additional sensors, to detect a movement, wherein the movement is made by the contactless media, are further configured to: emit one or more additional pulses at one or more additional emit times, wherein the one or more sensors are not located in the central region of the contactless media reader; and detect one or more additional return pulses at one or more additional detect times. The contactless media reader is further configured to: receive one or more additional distances from the one or more additional sensors, wherein the one or more additional distances are generated from the one or more additional emit times and the one or more additional detect times, and wherein the one or more additional distances correspond to the one or more additional distances from the moving object to the one or more additional sensors; detect a pattern from the movement across the one or more additional sensors; and send a message to the fare gate indicating a user selection, wherein the user selection is based on the pattern.

BRIEF DESCRIPTION OF THE DRAWINGS

The present disclosure is described in conjunction with the appended figures.

Figure 1:
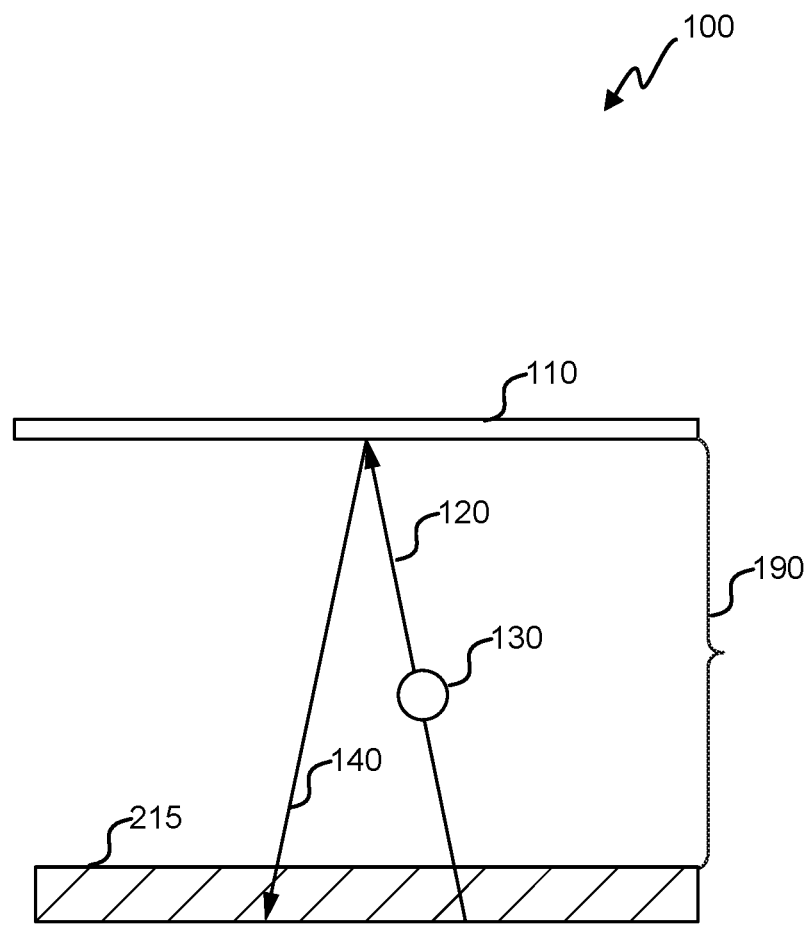
FIG. 1 is an example of an operating sensor.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention integrate a contactless media reader with sensors to detect that an object is within the contactless media reader's operating field. Other embodiments detect the position, orientation and speed of the object as it approaches the contactless media reader. The object can be, for example, a contactless fare media such as a contactless smartcard (CSC), a personal processing device such as a smart phone, personal computer, tablet computer or the like, or the user's hand, one or more fingers, or both. Other embodiments may use one or more distance/position sensors to determine the position of the contactless fare media relative to the contactless media reader. In some embodiments, the sensors could include one or more of the following: InfraRed reflection or transmission sensors, charge coupled device (CCD) cameras, Time-of-Flight sensors, ultrasonic sensors or capacitive sensors. Accordingly, some embodiments of the present invention enhance contactless media reader performance by adding user interaction capabilities and providing feedback to the contactless fare media user. Some embodiments may employ techniques described herein for other contactless media readers such as Bluetooth® Low Energy (BLE). One of skill in the art will recognize that any contactless media reader can be substituted with similar results.

In some embodiments it is sufficient to locate the contactless fare media within a certain range of the contactless media reader to ensure a reliable data exchange. In other cases the contactless fare media position and orientation will affect the transmission quality between the contactless fare media and the contactless media reader. One such example are CSCs where the data exchange and power transfer relies on sufficient coupling between a contactless media reader (CMR) and the CSC antenna coil. There are several possible card positions that have limited or no coupling between the CSC and the CMR. The detection of an object close to the CMR, or that an object is approaching at a minimum speed can be used to alert the CMR as well. The CMR can respond by waking up from a low power mode or it can refrain from starting tasks that would interfere or degrade a contactless fare media interaction. Once a transaction is completed, the CMR can use the position sensor to determine that the contactless fare media has been removed (i.e. has left the operating field) so that the CMR go into low power mode or engage in activity that would degrade a transactions such as updating flash memory. The detection of an object can also be used in a user interface to display a choice of user selection for a user to select between various options, authenticate ("3-D PIN code") or issue an alert (panic or alarm button), for example.

In some embodiments, the CMR can give feedback to the contactless fare media user based on the sensor input. For example, if a contactless fare media is placed incorrectly in the CMR field, a display or other output can prompt the contactless fare media holder to move the contactless fare media to the correct location to be in the field of the CMR. If the position of the contactless fare media is used for making a user selection, the display can show the current user selection, for example 'single-ride ticket,' 'weekly pass,' or 'add value,' for example. Thus, embodiments of the invention include CMRs that combine position sensing with additional CMR functionality with the ability to use a connected display or audio system to provide feedback to the user. As described above, embodiments could, for example, use inexpensive Time-of-Flight optical sensors (TOFs), but other embodiments may use other sensor methods (capacitive sensing, traditional optical sensing such as IR or cameras, or ultrasonic sonar, etc.).

Embodiments of the invention can include one or more of the following advantages: (1) they enable a CMR to go into a very low power deep-sleep mode, while waking up only when a contactless fare media is presented; (2) they prevent the number of false wake-ups; (3) they prevent the CMR from starting critical tasks such as Flash writing or code updating; (4) they ensure correct contactless fare media position before a critical interaction is started; (5) they give feedback to the contactless fare media user on how to correct contactless fare media presentation; (6) they provide anti tear protection; (7) they detect when a transaction is over and the contactless fare media holder has removed the contactless fare media; (8) they enable partitioning the CMR surface in different zones where placement of a contactless fare card indicates the user is choosing different actions; (9) they enable the contactless fare media holder to be authenticated based on the contactless fare media presentation pattern; and/or (10) they enable using presentation gestures for interacting with the CMR.

Referring first to FIG. 1 showing operation 100 to determine a distance between a sensor 215 and an object 110. The sensor 215 (see FIG. 2A) emits a pulse 120 containing one or more photons 130. The pulse reflection 140 returns to the sensor 215. The sensor 215 detects the time between emitting a pulse 120 and detecting the reflection 140 and determines a distance 190, using a speed-of-light calculation in the case of a light pulse, between the sensor 215 and the object 110. In other embodiments the pulse 120 could be an electrical charge and other calculations can produce the distance 190, based in part on charge levels. Embodiments may use one or more distance/position sensors 215 to determine the position of the object 110 relative to the sensor 215. For example, the sensors 215 could include one or more of the following types: InfraRed reflection or transmission sensors, charge coupled device cameras, Time-of-Flight sensors, ultrasonic sensors or capacitive sensors. Each of these types of sensors adhere to the basic principle of operation 100 in FIG. 1. It is readily understood by one of skill in the art that adding more sensors 215 operating in the manner shown in FIG. 1 would enable an embodiment that can determine not only location—but position and movement of object 110.

Figure 2A:
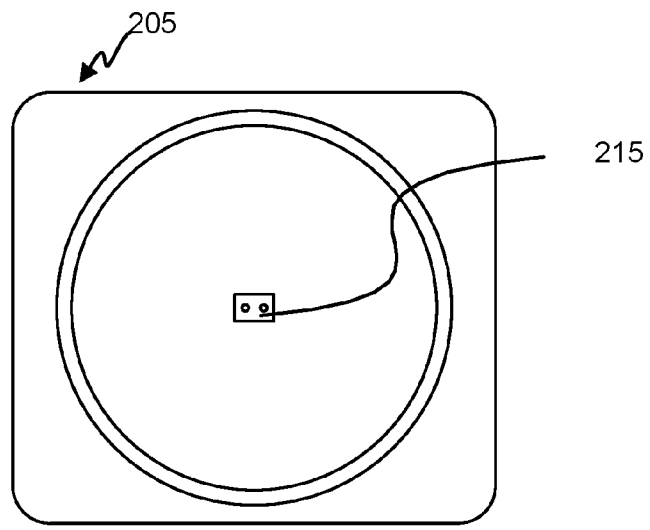
FIG. 2A is a. view of the contactless media reader with a time-of-flight sensor.
Figure 2B:
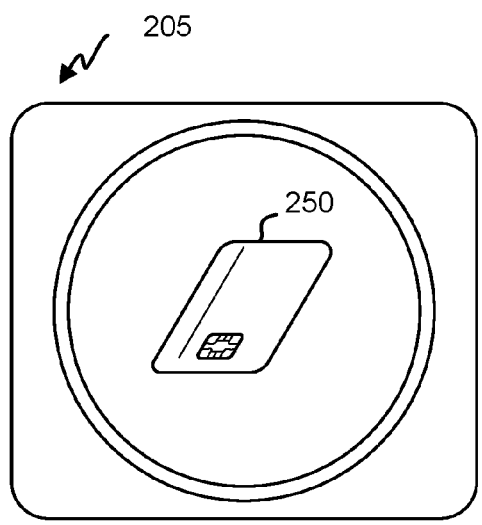
FIG. 2B is a. view of the contactless media reader with a time-of-flight sensor with a contactless smartcard within sensor range.
Figure 2C:
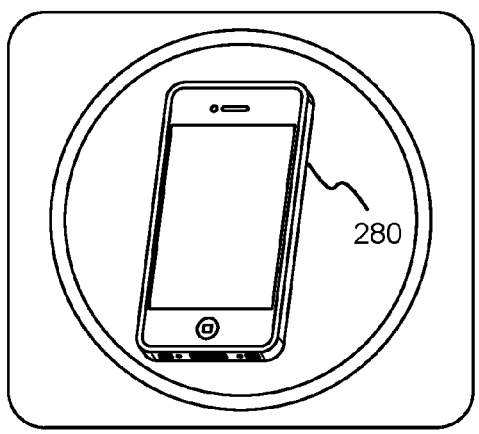
FIG. 2C is a. view of the contactless media reader with a time-of-flight sensor with a user device within sensor range.

Referring now to FIG. 2A, a direct or overhead view of an embodiment of the contactless media reader (CMR) 205 with integrated sensor 215. The CMR 205 detects that an object is within a CMR 205 operating field. In FIG. 2B a contactless fare media (FM) 250 is shown placed in the field of the CMR 205. The FM 250 can be, for example, a contactless fare media such as a contactless smartcard (CSC). Alternatively a user device (UD) 280 can be used as shown in FIG. 2C. A user device can be a smart phone, tablet computer, laptop computer, smart wearable device, or any other device with sufficient processing capability. Sensor 215 is located the central region of CMR 205 and can detect the presence of a FM 250, UD 280, or other object in the field of the sensor 215. The sensor 215 needs to be in the central region of the CMR 205 to accurately predict the distance/position of the FM 250 or UD 280, although it doesn't have to be exactly at the center of the CMR 205. Accordingly "the central region" corresponds to a placement of sensor 215, in a single sensor 215 configuration, to be only close enough to the center of CMR 205 to accurately determine the distance from the FM 250 or UD 280 to the CMR 205 with some tolerance. The tolerance with vary by CMR 205 from a fraction of millimeter to many millimeters in different embodiments. Other embodiments may employ techniques described herein for other contactless media readers such as Bluetooth® Low Energy (BLE). An advantage of CMR 205 in this embodiment is that the reader functionality portion of CMR 205 can stay "asleep" or in low power mode until sensor 215 senses that the FM 250 or UD 280 is in the proper place for the reader to process a transaction with the FM 250 or UD 280. This is advantageous in one way because this embodiment allows the CMR 205 to use less power because the reader portion does not always have to be in a find mode where it is continuously sending a signal looking for a FM 250 or UD 280. This embodiment allows the CMR 205 to go into a very low power deep-sleep mode and wake up as soon as a FM 250 or UD 280 is presented at the correct position. Furthermore, accurate distance measurements of how far the FM 250 or UD 280 is away from the CMR 205 will limit the number of false wake-ups for the reader portion of CMR 205.

Another advantage of this embodiment is that it enables the CMR 205 to delay starting critical tasks such as updating internal code or flash memory and other such tasks when a FM 250 or UD 280 is in proximity of the CMR 205. In some embodiments the CMR 205 cannot communicate with the FM 250 or UD 280 during such tasks, resulting in long wait times to read FM 250 or UD 280 and process a transaction. In other embodiments the CMR 205 has degraded performance during such tasks—that also results in long wait time to read the FM 250 or the UD 280. Yet another advantage of this and other embodiments is that the sensor 215 ensures a correct FM 250 or UD 280 position before a critical FM 250 or UD 280 interaction is started. In some cases FM 250 is of a type with limited transaction capability. In those cases this prevents wasting a transaction on an incomplete interaction due to the FM 250 not being in the right location or at a correct distance from the CMR 205. Another advantage is that sensor 215 can communicate with the fare gate processor 500 (shown in FIG. 5) to display image feedback on display 410 (shown in FIG. 4) to a FM 250 or UD 280 user displaying the incorrect location of the FM 250 or UD 280 and displaying the correct placement for a successful transaction. In the same light—sensor 215 can communicate with fare gate processor 500 (shown in FIG. 5) to give audio feedback through audio system 420 (shown in FIG. 4) for the same reason. Another advantage is to prevent the FM 250 from "tearing"—or in other words—interrupting a data write to the FM 250 leaving a data block in the FM 250 with corrupted data. When a data write to a data block only happens when the FM 250 is correctly placed in the field of the CMR 205, the chance of tearing is reduced. Another advantage of sensor 215 on CMR 205 is that sensor 215 can detect when the FM 250 or UD 280 has been removed such that the reader portion can stop signaling, and in some embodiments, enter sleep mode or perform other critical tasks such as updating flash memory.

Next referring to FIG. 2B showing CMR 205 with a FM 250 over the sensor 215. In this position the CMR 205 can exchange data with the FM 250—or in another embodiment—the presence of FM 250 over the sensor 215 could be indicating a user selection made by the FM 250 holder responding to a request to place the FM 250 at the sensor location to choose an option such as fare class, fare type, a panic situation, etc. In FIG. 2C a UD 280 is shown over the sensor 215.

Figure 3A:
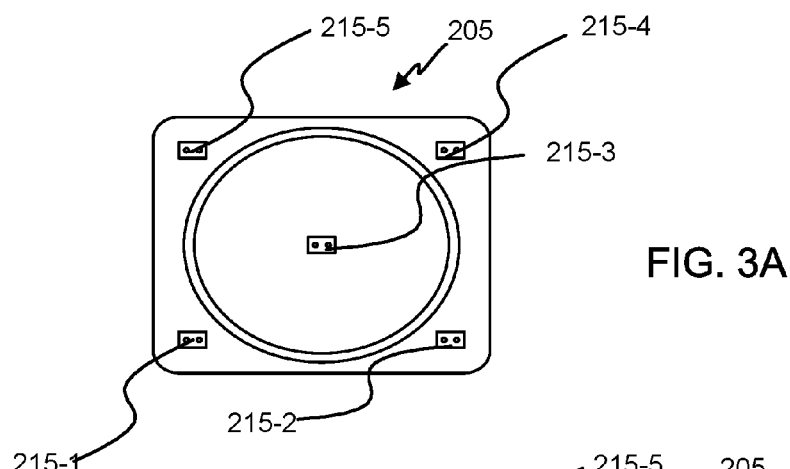
FIG. 3A is a. view of the contactless media reader with a five time-of-flight sensors.
Figure 3B:
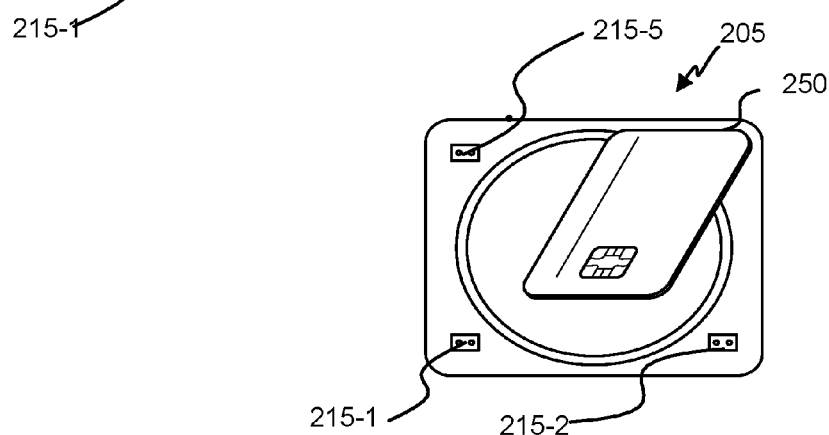
FIG. 3B is a. view of the contactless media reader with five time-of-flight sensors and a contactless media within range of two sensors.
Figure 3C:
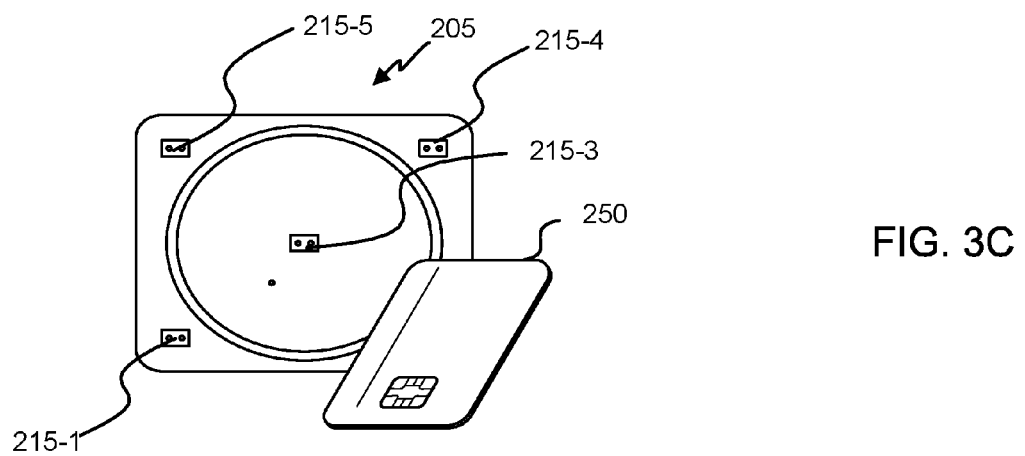
FIG. 3C is a. view of the contactless media reader with a five time-of-flight sensors and a contactless media within range of one sensor.

And FIG. 3A shows a CMR 205 with 5 sensors 215. Sensor 215-3 is in the center of CMR 205. Sensor 215-1, 215-2, 215-4, and 215-5 are at respective corners of the CMR 205. There are at least two advantages to this embodiment. The first advantage is that the placement of the FM 250 or UD 280 can be more accurately determined with more than one sensor 215. The second advantage is that with more sensors 215—more user selections can be offered to a FM 250 or UD 280 holder. As shown in FIG. 3B, the FM 250 is placed in front of both sensor 215-3 and sensor 215-4. In FIG. 3A, the FM 250 is placed in front of sensor 215-2. One of skill in the art can easily understand that with more sensors 215 present—more user selections are available with different combinations of the sensors 215. The types of user selections can be related to final destination, fare type, fare class, or any other such user selections. Furthermore—with more than one sensor—gestures can be detected as further discussed in FIGS. 7 and 8. Sensors 215 can also authenticate the contactless fare media user through a FM 250 or UD 280 presentation pattern—for instance—by swiping the card in a cross or other pattern such as a figure eight pattern. Furthermore, sensors 215 can also recognize patterns from a contactless fare media user's gestures such as a cross or figure eight pattern made by the user's hand, one or more fingers, or both.

In some embodiments, the CMR 205 can give feedback to the FM 250 or UD 280 user based on the sensor 215 input. For example, if a FM 250 or UD 280 is placed incorrectly in the CMR 205 field, the display system 410 (shown in FIG. 4) or audio system 420 (shown in FIG. 4) can prompt the FM 250 or UD 280 holder to move the FM 250 or UD 280 to a location in the field of the CMR 205. The FM 250 or UD 280 position can also determine the FM 250 or UD 280 user's selection using the display system 410 (shown in FIG. 4) to show the current user selection, for example 'single-ride ticket,' 'weekly pass,' or 'add value,' for example. In such embodiment the sensors 215 can detect objects including FM 250s or UDs 280 in areas near the CMR 205 corresponding to each user selection just given. Thus, some embodiments of the invention include a CMR 205 combine position sensing with additional CMR 205 functionality. As described above, embodiments could, for example, use inexpensive time-of-flight optical sensors (TOFs), but other embodiments may use other sensor methods (capacitive sensing, traditional optical sensing such as IR or cameras, ultrasonic sonar).

Figure 4:
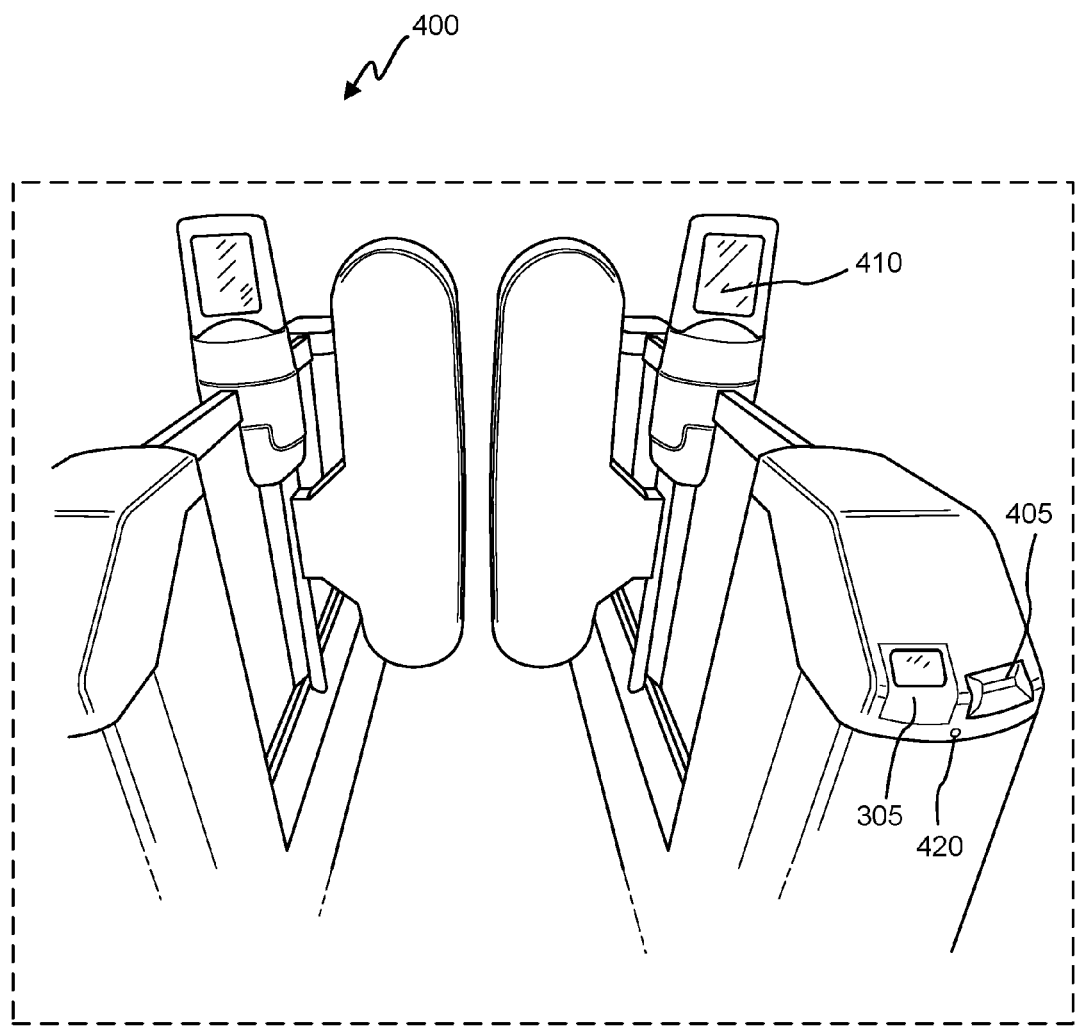
FIG. 4 is a perspective view of an embodiment of a fare gate with a contactless media reader embodiment of the invention.

Referring now to FIG. 4 that depicts a fare gate (FG) 400 that can be used in one embodiment, at the entry of a transit system, entertainment venue, building, or any other metered entry. One of ordinary skill in the art will recognize that FG 400 can vary in appearance and functionality. FG 400 can include a CMR 205 whereby the FM 250 or UD 280 does not have to make contact with the CMR 205 to process transactions. FG 400 can have an audio system 420. Audio system 420 can give verbal instructions on using any of the components of FG 400. For instance, in one embodiment audio system 420 can alert the FM 250 holder that the FM 250 or UD 280 is not correctly placed to process a transaction on the contactless media reader (CMR) 305. FG 400 can contain a display system 410. For instance, in another embodiment, display system 410 can display a message for the FM 250 holder that the FM is not in the correct place and can identify to the FM 250 holder where to correctly place the FM 250 to process the transaction. In other embodiments the display system 410 can display any manner of other messages including instructions for using FG 400, instructions for using the transit system 100, and advertising. FG 400 can also comprise a fare reader 405 for fare media that are not of the contactless type. One of skill in the art will recognize that the fare gate 400 barriers would open up to allow the FM 250 holder passage upon a successful transaction between the CMR 205 and the FM 250 or UD 280.

Figure 5:
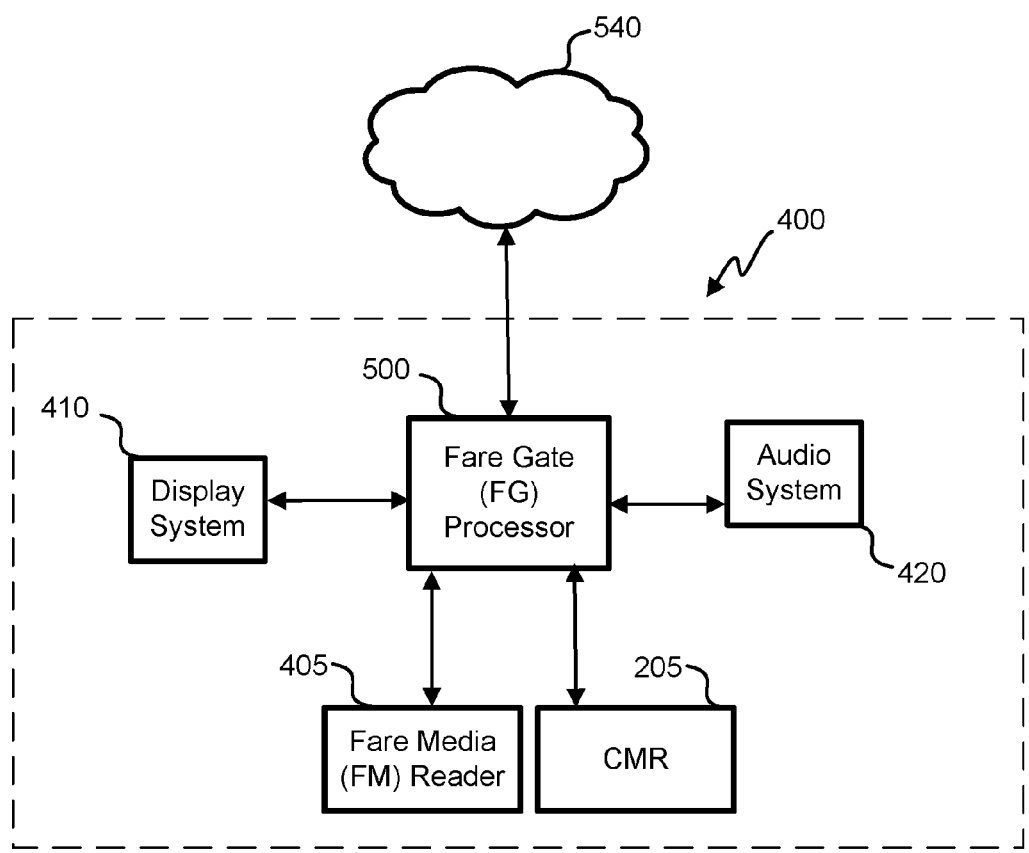
FIG. 5 is a schematic illustration of one embodiment of a fare gate.

With reference now to FIG. 5 that depicts a block diagram of components of FG 400 in one embodiment of the present invention in communication with network 540. In this embodiment the FG processor 500, comprising a CPU or other type of hardware processing unit including associated memory, communication, and other components as described in FIG. 12 for UD 280, communicates with the network 540. The FG processor 500 can communicate with the display system 410 and provides the messaging presented on the display system 410. FG processor 500 can generate the messages to be displayed on the display system 410 or receive the message to be displayed from any number of sources over network 540. The FG processor 500 can communicate with the audio system 420. The FG processor 500 can generate the messages broadcast from the audio system 420 or receive the message to be broadcast from any number of sources over the network 540. The FG processor 500 can communicate with CMR 205. The FG processor can determine if the FM 250 allows passage or can send the FM 250 information over the network 540 to make the determination. The FG processor 500 can also communicate with the FM 250 or UD 280 in some embodiments directly or pass information and instructions from other sources connected to the network 540. The FG processor 500 also communicates with CMR 205 and relays information from and to the other systems such as to the audio system 420 to give an audio indication that FM 250 or UD 280 is not correctly placed or to the display system 410 to show where the FM 250 or UD 280 should be placed. Sensors 215 (described in FIG. 6) on the CMR 205 also communicate with FG processor 500 to calculate distance and position of the FM 250 or UD 280 (or even hands or one or more fingers) relative to the CMR 205.

Figure 6A:
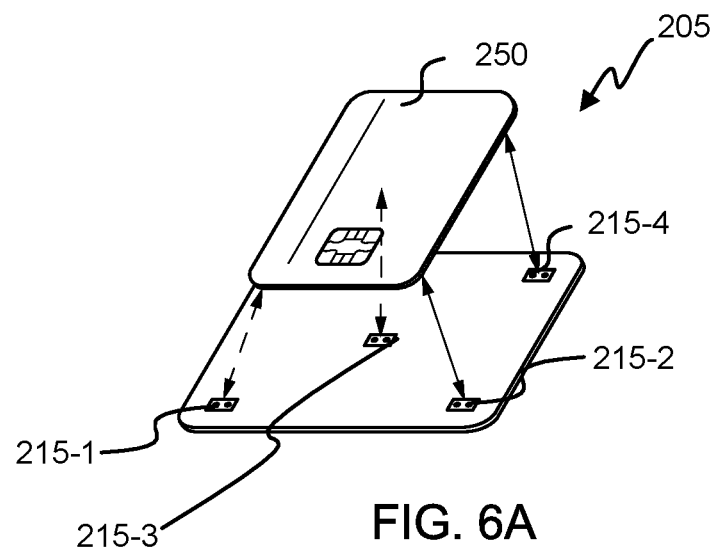
FIG. 6A is a. view of the contactless media reader with five time-of-flight sensors and a contactless media correctly placed within range of all sensors.
Figure 6B:
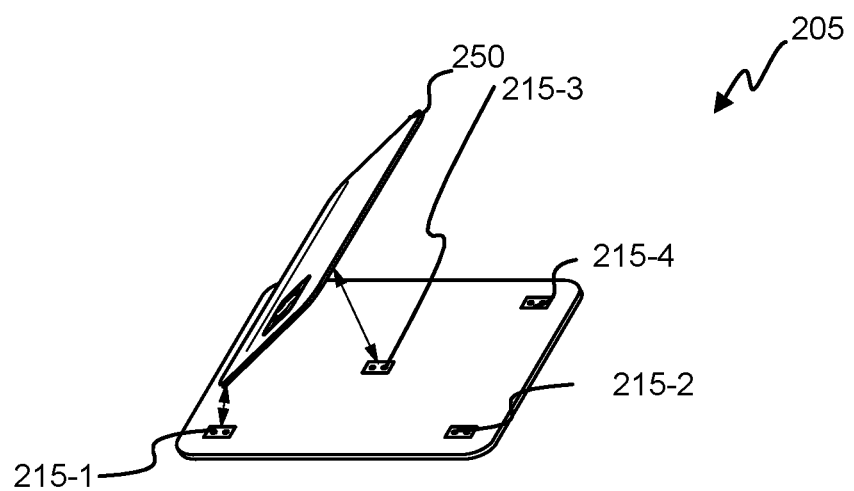
FIG. 6B is a. view of the contactless media reader with five time-of-flight sensors and a contactless media incorrectly placed, but within range of all sensors.

Referring now to FIGS. 6A and 6B. Both Figures show the FM 250 positioned such that the CMR 205 can exchange data with FM 250, however FIG. 6A shows the correct positioning of the FM 250 over the CMR 205 and FIG. 6B shows the FM 250 at and extreme angle—though in this particular embodiment the data exchange and power transfer occur because there is sufficient coupling between the CMR 205 and FM 250 antenna coil. In FIG. 6A the FM 250 is in the correct placement for the FM 250 to make a good connection with the CMR 205 (i.e.—within the CMR 205 operating field) to conduct a reliable data exchange. Once a transaction is completed, the CMR 205 can use the sensors 215 to determine that the FM 250 has been removed (i.e. has left the operating field) so that the CMR 205 can start looking for a new FM 250, enter low power mode, or perform other operations such a updating the CMR 205 flash memory.

Figure 7A:
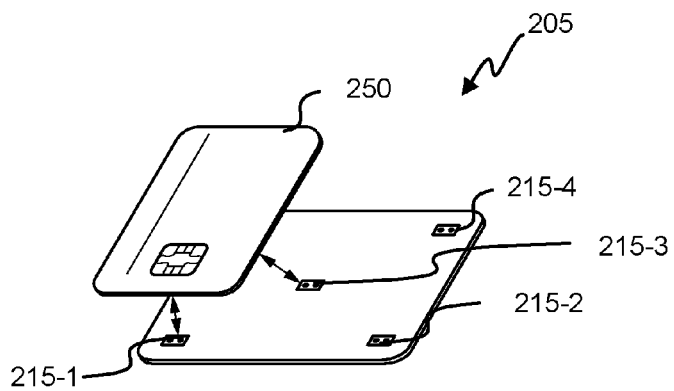
FIG. 7A depicts a contactless card to far to the left of the contactless media reader.
Figure 7B:
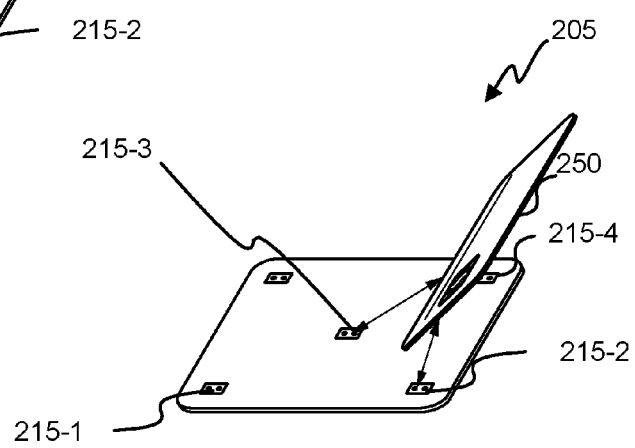
FIG. 7B depicts a contactless smartcard angled too much for the contactless media reader to read it.
Figure 7C:
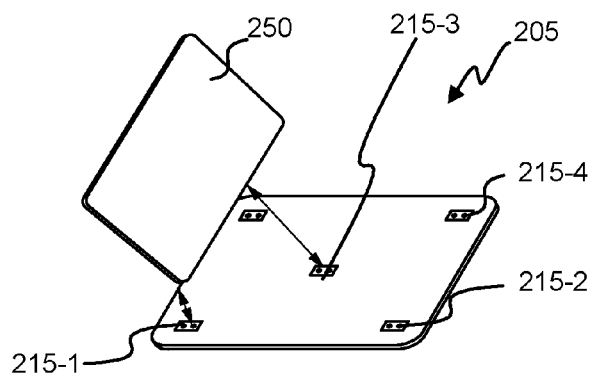
FIG. 7C depicts a contactless smartcard angled too much for the contactless media reader to read it.
Figure 7D:
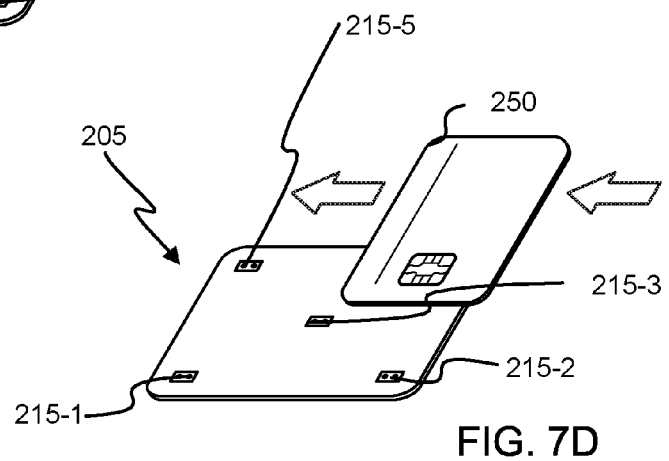
FIG. 7D depicts a contactless smartcard passing from right to left but not to the center of the contactless media reader.

Referring now to FIGS. 7A-7D, showing the different positions of a FM 250 in respect to the CMR 205 where proper coupling between the CMR 205 and FM 250 antenna coil is not present as needed to conduct a data transaction. While only four positions are shown in FIGS. 7A to 7D, there are many possible FM 250 positions that have limited or no coupling between the FM 250 and the CMR 205. In other cases the FM 250 position and orientation can affect the transmission quality between the FM 250 and the CMR 205. In FIG. 7A the FM 250 is too far to the left of the center of the CMR 205 for processing a transaction. In FIGS. 7B and 7C the FM 250 is too angled from the center of the CMR 205 to make a good connection. The detection of the FM 250 close to the CMR 205, or that the FM 250 is approaching at a minimum speed can be used to alert the CMR 205 to go from low power mode to a mode to detect the FM 250. In FIG. 7D the FM 250 is passing over the CMR 205 from right to left and thus cannot make a connection but the sensors 215 will sense the FM 250 and enable the CMR 205 to awaken and be ready to read the FM 250. CMR 205 will also know that it cannot begin tasks that would interfere with or degrade a transaction with FM 250—for instance—updating the CMR 205 flash memory or operating instructions. Since the sensors 215 sense the location of an object such as the FM 250 the position or movement of the FM 250 can also indicate other choices such as fare type and fare class or it could indicate another message such as a panic message. The FM 250 in FIG. 7A is in the position to the left, for instance, that could indicate such a user selection.

Now turning to FIGS. 8A-8D that show a finger 805 gesturing with the CRM 305. Gesture detection can allow the CRM 305 to offer better authentication and more user selections to a FM 250 holder. For instance, an authenticating gesture can be stored for each FM 250 or UD 280 holder. Display 410 or audio system 420 can request that an authentication gesture be made by the FM 250 or UD 280 holder after (or in some enablements, before) CRM 305 reads the FM 250 or UD 280 before opening the FG 400 barrier. Sensors 215 can detect the position of the hand or fingers using methods discussed for FIG. 1 above, and FG processor 500 can use the information from sensors 215 to determine if a gesture has been made that authenticates the FM 250 or UD 280 holder. As another possibility, a FM 250 or UD 280 may have an account that requires the authentication gesture after presenting the FM 250 or UD 280 to open the barrier without a request or reminder from display 410 or audio system 420. It can be understood by one in the art that The display 410 and audio system 420 can act in concert to make requests, give instructions, etc., throughout this description. The display 410 could also display a menu with instructions about what gestures need to be made to indicate a choice for user selection of a menu item. Likewise audio system 420 can tell the FM 250 or UD 280 holder what gesture needs to be made to indicate a choice from an audible menu. The type and variety of gestures are too many to note but include the figure eight, a cross, an "X", etc.

Figure 8A:
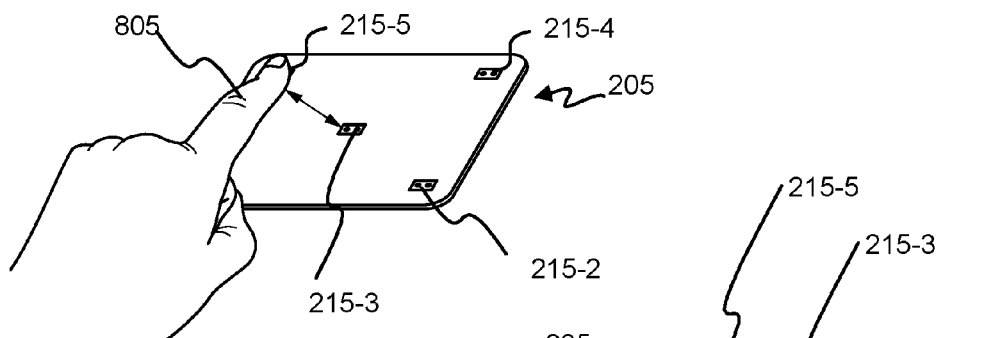
FIG. 8A depicts a first finger gesture.
Figure 8B:
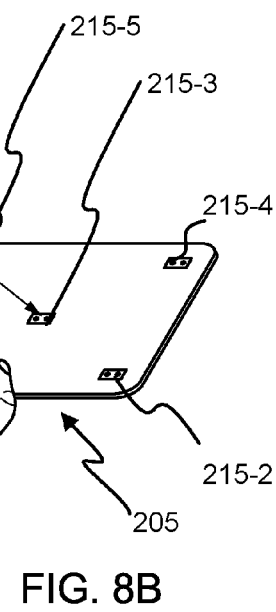
FIG. 8B depicts a second finger gesture.
Figure 8C:
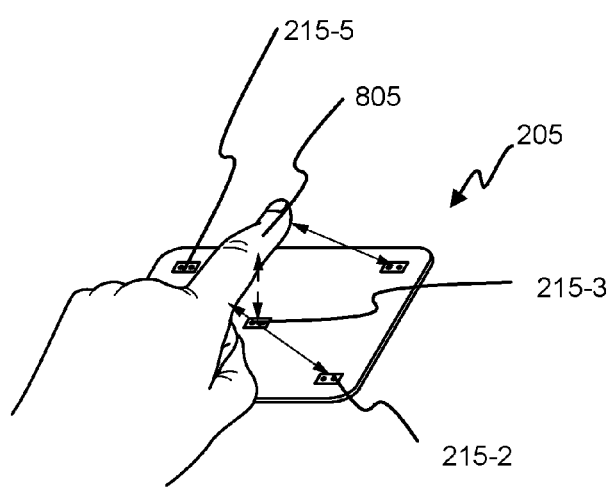
FIG. 8C depicts a third finger gesture.
Figure 8D:
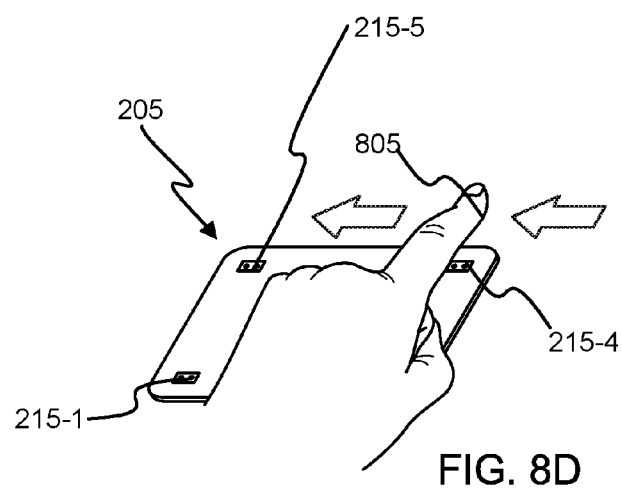
FIG. 8D depicts a fourth finger gesture.

FIG. 8A shows the finger 805 in the top left corner of the CRM 305. This could indicate the user is selecting a choice based on that position. For instance it could indicate agreement to a fare type or class, a routing choice, a payment method, or any other type of choice appropriate. The sensors 215 could provide an additional level of authentication as well—if the pre-selected authentication position is a finger motion to the top left of the CRM 305. In FIG. 8B the finger 805 is gesturing to an angle on one side of the CRM 305. All of positioning options as previously discussed for FIG. 8A apply to this FIG. 8B as well as FIGS. 8C and 8D. In FIG. 8C the finger is shown at the center of CMR 205. In FIG. 8D the finger is gesturing from right to left—adding an addition level of choice or authentication. One of skill in the art can recognize that sensors 215 can recognize gesture patterns in such embodiments as shown in FIGS. 8A-8D.

Figure 9:
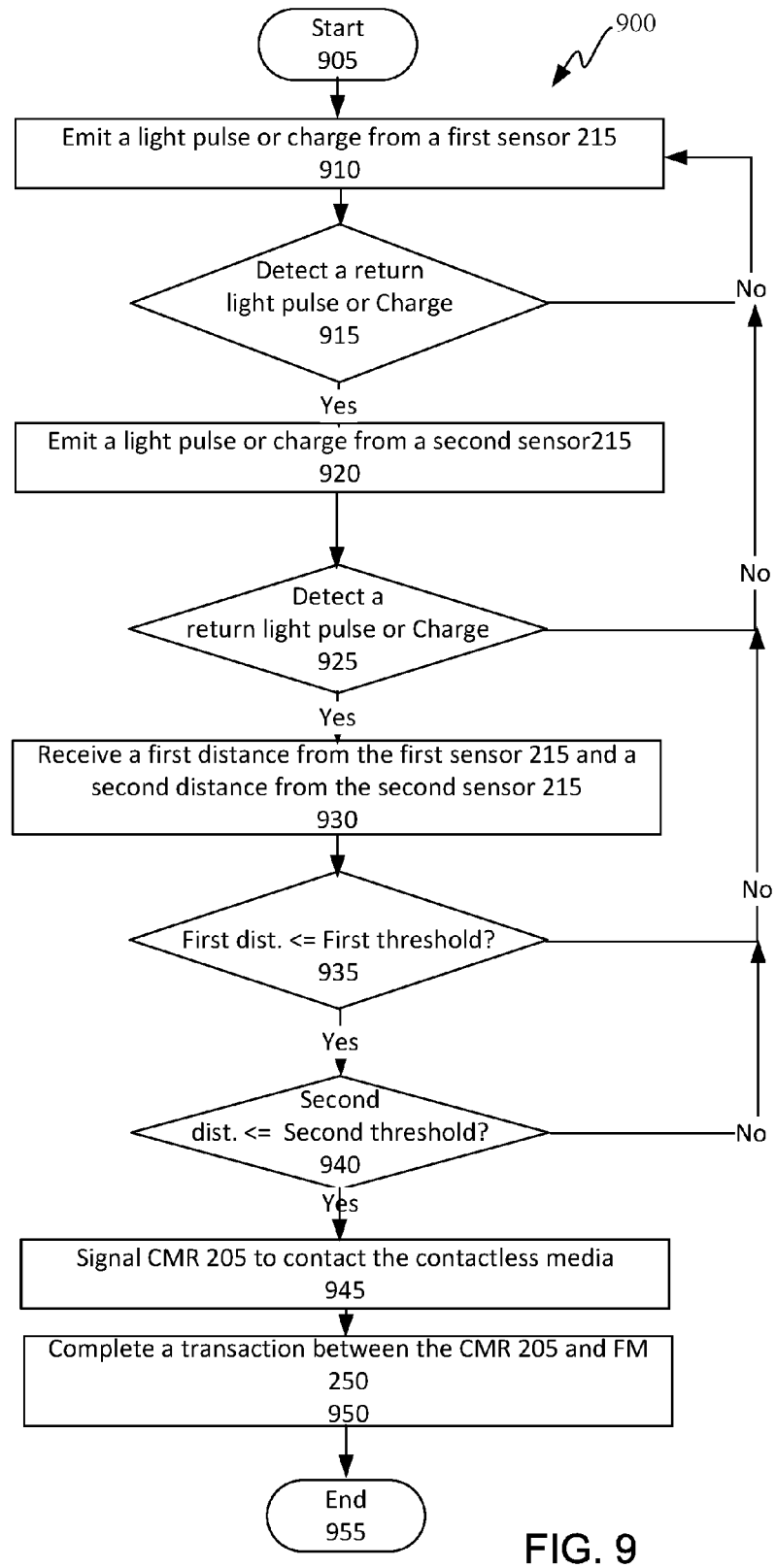
FIG. 9 is a flowchart showing one embodiment of sensors integrated into a contactless media reader.

Referring now to FIG. 9, a flowchart 900 depicting the operation of an embodiment of the present invention. Starting at 905 and moving to block 910 where a first sensor 215 emits a light pulse or a charge. Next at block 915 if a return light pulse or charge is detected by first sensor 215 then a second sensor 215 emits a light or charge at block 920. If first sensor 215 does not detect a light pulse or charge at block 915 the next block is 910 repeated again. At block 925 if a return light pulse or charge is not detected by second sensor 215 then block 910 is repeated again. At block 925 if a return light pulse or charge is detected, then at block 930 the first delay from the first sensor 215 emitting a pulse or charge is measured by the difference in time between emitting the light pulse or charge and detecting the return light pulse or charge. At block 930 the same calculation is performed to determine the second delay. Once a delay is calculated in the light pulse case the distance from the contactless media to the sensor can be calculated using the speed of light and the delay time. A similar method is used for the charge delay to determine distance. However, a threshold can also be determined in the time domain that corresponds to a delay time that corresponds to a distance that is less than or equal to the distance from FM 250 to the CMR 205 that is suitable for good signaling between the two. The distance threshold for the first sensor 215 is compared to the first distance from the first sensor 215 at block 935. If the first distance is less than or equal to that first threshold (in other words—the distance is close enough for good signaling) then the same comparison is done at block 940 with the second distance. If either the first or second distances are not less than or equal to the first and second thresholds respectively, then the next block performed is 910 again. Otherwise the CMR 205 is signaled to "wake up" and begin communication with the FM 250 at block 945. Then at block 950 the FM 250 and the CMR 205 complete a transaction at block 950 and end at block 955. One of skill in the art can readily see that adding more sensors increases the ability to more accurately determine the position of the FM 250 relative to the reader. As shown in FIG. 6, five sensors 215 are used in that embodiment.

Figure 10:
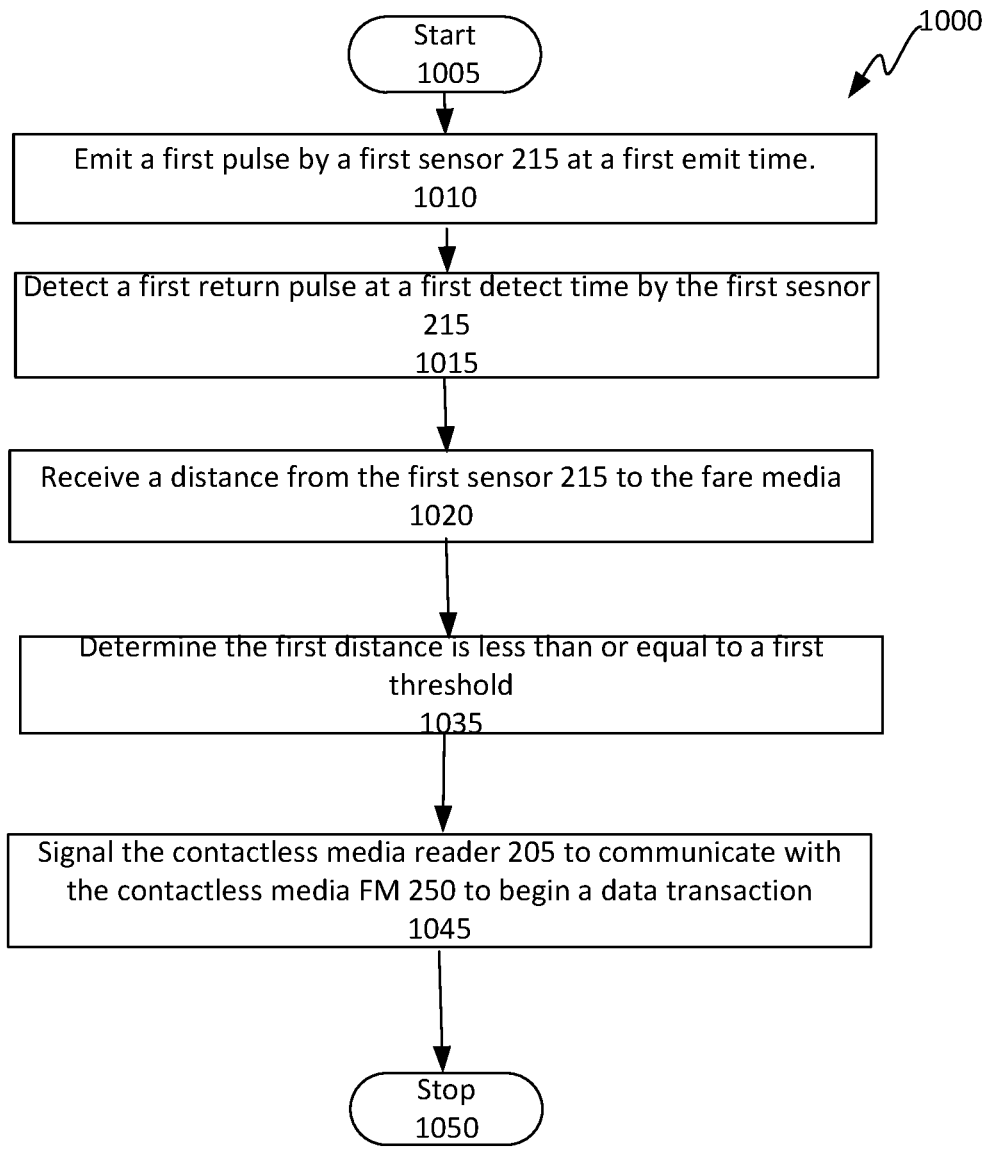
FIG. 10 is a flowchart showing one implementation of one embodiment of sensors integrated into a contactless media reader.

With reference now to FIG. 10, a flowchart of a method of sensors 215 detecting the FM 250 or UD 280 to facilitate an interaction between CMR 205 and FM 250 or UD 280. Starting at block 1005 then at block 101 the sensor 215 emits a pule at a first emit time. At block 1015 the sensor 215 detects the pulse at a first detect time. Then at block 1020 the sensor sends a distance to the CMR 205 corresponding to the distance between the sensor 215 and the FM 250. At block 1035 the CMR 205 determine the distance is less than a threshold, indicating that the FM 250 is close enough to CMR 205 to have good signaling. At block 1045 the CMR 205 begins a transaction with the FM 250. Block 1050 is the end.

Figure 11:
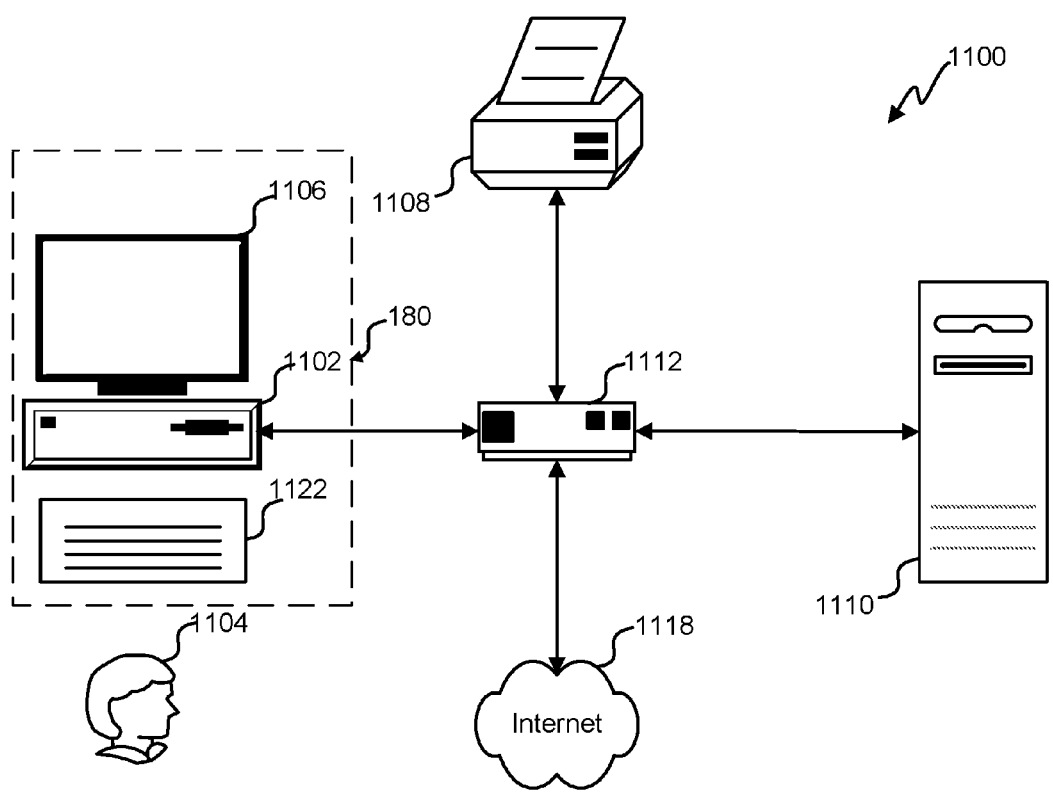
FIG. 11 depicts a block diagram of an embodiment of a computer system.

With reference now to FIG. 11, an exemplary environment in which embodiments may be implemented is shown with a UD 280 that can be used by a media user 1104. The computer system 1100 can include a computer 1102, keyboard 1122, a network router 1112, a printer 1108, and a monitor 1106. The monitor 1106, processor 1102 and keyboard 1122 can be parts of UD 280, that may be a smart phone or other mobile phone (including a near-field-communication enabled mobile phone), a tablet personal computer (PC), a personal digital assistant (PDA), an e-book reader, wearable device, or other device. The monitor 1106 can be a CRT, flat screen, etc.

A contactless fare media user 1104 can input commands into the computer 1102 using various input devices, such as a mouse, keyboard 1122, track ball, touch screen, voice command, etc. If the computer system 1100 comprises a mainframe, a designer 1104 can access the computer 1102 using, for example, a terminal or terminal interface. Additionally, the UD 280 may be connected to a printer 1108 and a server 1110 using a network router 1112, which may connect to the Internet 1118 or a wide area network.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the contactless fare media user device 180. Therefore, in this embodiment, the software can be used whether or not computer 1102 is connected to network router 1112. Printer 1108 may be connected directly to computer 1102, in which case, the contactless fare media user device 180 can print whether or not it is connected to network router 1112.

Figure 12:
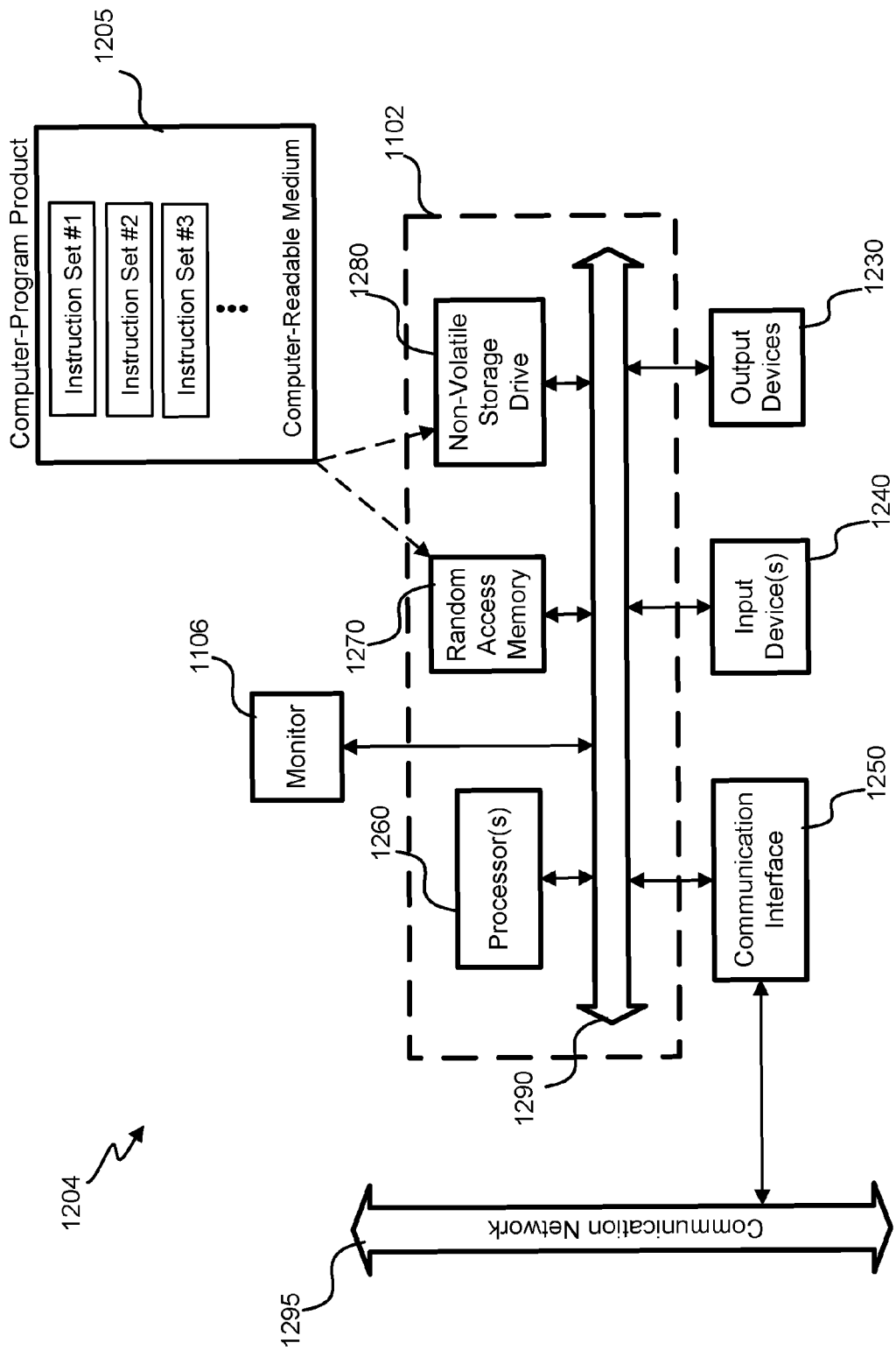
FIG. 12 depicts a block diagram of an embodiment of a special-purpose computer system.

With reference to FIG. 12, an embodiment of a special-purpose computer system 1204 is shown. The above methods may be implemented by computer-program products that direct a computer system to perform the actions of the above-described methods and components. Each such computer-program product may comprise sets of instructions (code) embodied on a computer-readable medium that directs the processor of a computer system to perform corresponding actions. The instructions may be configured to run in sequential order, or in parallel (such as under different processing threads), or in a combination thereof. After loading the computer-program products on the contactless fare media user device 180, it is transformed into the special-purpose computer system 1204.

Special-purpose computer system 1204 comprises a computer 1102, a monitor 1106 coupled to computer 1102, one or more additional fare media user output devices 1230 (optional) coupled to computer 1102, one or more fare media user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs system 1204 to perform the above-described methods. Computer 1102 may include one or more processors 1260 that communicate with a number of peripheral devices via a bus subsystem 1290. These peripheral devices may include fare media user output device(s) 1230, fare media user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows® or the like from Microsoft® Corporation, Solaris® from Oracle®, LINUX, UNIX, and the like.

Fare media user input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, fare media user input devices 1240 are typically embodied as a computer mouse, a trackball, a track pad, a joystick, wireless remote, a drawing tablet, a voice command system. Fare media user input devices 1240 typically allow a contactless fare media user to select objects, icons, text and the like that appear on the monitor 1106 via a command such as a click of a button or the like. Fare media user output devices 1230 include all possible types of devices and mechanisms to output information from computer 1102. These may include a display (e.g., monitor 1106), printers, non-visual displays such as audio output devices, etc.

Communications interface 1250 provides an interface to other communication networks 1295 and devices and may serve as an interface to receive data from and transmit data to other systems, wide area network s and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interacting with actual hardware in a meaningful way. Examples of the physical layer include Ethernet, FDDI, B8ZS, V.35, V.24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4 provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing data. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

What is claimed is:

1. A method of integrating contactless media readers with sensors for completing data transactions with contactless media, the method comprising:
   detecting a contactless media by:
      emitting a first pulse, by a first sensor, at a first emit time, wherein the first sensor is at a first location in the central region of a contactless media reader; and
      detecting, by the first sensor, a first returned pulse reflected from the contactless media, at a first detect time;
   in response to the detecting the contactless media:
      calculating a first distance from the contactless media to the first sensor based on the first emit time and the first detect time;
      comparing the first distance to the first threshold; and
      determining the first distance is less than or equal to a first threshold; and
   transmitting data from the contactless media reader to the contactless media, wherein the data facilitates a transaction between the contactless media reader and the contactless media.

2. The method of integrating contactless media readers with sensors for data transactions with contactless media of claim 1, wherein the contactless media reader is a radio frequency reader or a Bluetooth ® Low Energy reader.

3. The method of integrating contactless media readers with sensors for data transactions with contactless media of claim 1, wherein the sensor is an InfraRed reflection or transmission sensor, charge coupled device camera, time-of-flight sensor, ultrasonic sensor, or capacitive sensor.

4. The method of integrating contactless media readers with sensors for data transactions with contactless media of claim 1, wherein the contactless media is a contactless smart card or a user device.

5. The method of integrating contactless media readers with sensors for data transactions with contactless media of claim 1, the method further comprising:
   detecting an object by:
      emitting a second pulse, by the first sensor, at a second emit time;
      detecting, by the first sensor, a first returned pulse at a first detect time;
   in response to the detecting the object:
      receiving a second indicator of a second distance from the first sensor,
   wherein the second distance is generated from the second emit time and the second detect time, and wherein the second distance corresponds to a computed distance from the object to the first sensor;
      determining the second distance is less than or equal to a second threshold; and
      determining a user selection, wherein the user selection is based on the detection of the object at the second distance.

6. The method of integrating contactless media readers with sensors for data transactions with contactless media of claim 5, wherein the object is the contactless media.

7. The method of integrating contactless media readers with sensors for data transactions with contactless media of claim 1, wherein:
   detecting a movement made by the contactless media comprises:
      emitting one or more additional pulses, by one or more additional sensors, at one or more additional emit times, wherein the one or more sensors are not located in the central region of the contactless media reader; and
      detecting, by the one or more additional sensors, one or more additional return pulses at one or more additional detect times; and
   in response to the detecting the moving object:
      receiving one or more additional indicators of one or more additional distances from the one or more additional sensors, wherein the one or more additional distances are generated from the one or more additional emit times and the one or more additional detect times, and wherein the one or more additional distances correspond to the one or more additional distances from the moving object to the one or more additional sensors; and
      detecting a pattern from the movement across the one or more additional sensors; and
      determining a user selection, wherein the user selection is based on the pattern.

8. A system for integrating contactless media readers with sensors for completing data transactions with contactless media, the system comprising:
   a first sensor, to detect a contactless media, configured to:
      emit a first pulse, at a first emit time, wherein the first sensor is at a first location in the central region of the contactless media reader; and
      detect a first returned pulse, reflected from the contactless media, at a first detect time;
   a contactless media reader configured to:
      calculate a first distance from the contactless media to the first sensor based on the first emit time and the first detect time;
      compare the first distance to the first threshold;
      determine the first distance is less than or equal to a first threshold; and
      transmit data from the contactless media reader to the contactless media, wherein the data facilitates a transaction between the contactless media reader and the contactless media.

9. The system for integrating contactless media readers with sensors for completing data transactions with contactless media of claim 8, wherein the contactless media reader is an radio frequency reader or a Bluetooth ® Low Energy reader.

10. The system for integrating contactless media readers with sensors for completing data transactions with contactless media of claim 8, wherein the sensor is an InfraRed reflection or transmission sensor, charge coupled device camera, time-of-flight sensor, ultrasonic sensor, or capacitive sensor.

11. The system for integrating contactless media readers with sensors for completing data transactions with contactless media of claim 8, wherein the contactless media is a contactless smart card or a user device.

12. The system for integrating contactless media readers with sensors for completing data transactions with contactless media of claim 8, the system further comprising:
the first sensor, to detect an object, further configured to:
emit a second pulse at a second emit time; and
detect a first returned pulse at a first detect time;
the contactless media reader further configured to:
receive a second indicator of a second distance from the first sensor, wherein the second distance is generated from the second emit time and the second detect time, and wherein the second distance corresponds to a computed distance from the object to the first sensor;
determine the second distance is less than or equal to a second threshold; and
determine a user selection, wherein the user selection is based on the detection of the object at the second distance.

13. The system for integrating contactless media readers with sensors for completing data transactions with contactless media of claim 12, wherein the object is the contactless media.

14. The system for integrating contactless media readers with sensors for completing data transactions with contactless media of claim 8, further comprising:
one or more additional sensors, to detect a movement made by the contactless media, configured to:
emit one or more additional pulses at one or more additional emit times, wherein the one or more sensors are not located in the central region of the contactless media reader; and
detect one or more additional return pulses at one or more additional detect times;
the contactless media reader further configured to:
receive one or more additional indicators of one or more additional distances from the one or more additional sensors, wherein the one or more additional distances are generated from the one or more additional emit times and the one or more additional detect times, and wherein the one or more additional distances correspond to the one or more additional distances from the moving object to the one or more additional sensors; and
detect a pattern from the movement across the one or more additional sensors; and
determine a user selection, wherein the user selection is based on the pattern.

15. A fare gate with a contactless media reader, integrated with sensors, for completing data transactions with contactless media, the fare gate comprising:
a first sensor, to detect a contactless media, configured to:
emit a first pulse, at a first emit time, wherein the first sensor is at a first location in the central region of the contactless media reader; and
detect a first returned pulse, reflected from the contactless media, at a first detect time;
the contactless media reader configured to:
calculate a first distance from the contactless media to the first sensor based on the first emit time and the first detect time;
compare the first distance to the first threshold;
determine the first distance is less than or equal to a first threshold; and
transmit data from the contactless media reader to the contactless media, wherein the data facilitates a transaction between the contactless media reader and the contactless media.

16. The fare gate with a contactless media reader, integrated with sensors, for completing data transactions with contactless media of claim 15, wherein the contactless media reader is an radio frequency reader or a Bluetooth ® Low Energy reader.

17. The fare gate with a contactless media reader, integrated with sensors, for completing data transactions with contactless media of claim 15, wherein the sensor is an InfraRed reflection or transmission sensor, charge coupled device camera, time-of-flight sensor, ultrasonic sensor, or capacitive sensor.

18. The fare gate with a contactless media reader, integrated with sensors, for completing data transactions with contactless media of claim 15, wherein the contactless media is a contactless smart card or a user device.

19. The fare gate with a contactless media reader, integrated with sensors, for completing data transactions with contactless media of claim 15, the system further comprising:
the first sensor, to detect an object, further configured to:
emit a second pulse at a second emit time; and
detect a first returned pulse at a first detect time;
the contactless media reader further configured to:
receive a second indicator of a second distance from the first sensor, wherein the second distance is generated from the second emit time and the second detect time, and wherein the second distance corresponds to a computed distance from the object to the first sensor;
determine the second distance is less than or equal to a second threshold; and
send a message to the fare gate indicating a user selection, wherein the user selection is based on the detection of the object at the second distance.

20. The fare gate with a contactless media reader, integrated with sensors, for completing data transactions with contactless media of claim 15, wherein:
one or more additional sensors, to detect a movement made by the contactless media, configured to:
emit one or more additional pulses at one or more additional emit times, wherein the one or more sensors are not located in the central region of the contactless media reader; and
detect one or more additional return pulses at one or more additional detect times; and
the contactless media reader further configured to:
receive one or more additional indicators of one or more additional distances from the one or more additional sensors, wherein the one or more additional distances are generated from the one or more additional emit times and the one or more additional detect times, and wherein the one or more additional distances correspond to the one or more additional distances from the moving object to the one or more additional sensors; and
detect a pattern from the movement across the one or more additional sensors; and
send a message to the fare gate indicating a user selection, wherein the user selection is based on the pattern.

* * * * *